United States Patent [19]

Uyama et al.

[11] 4,137,978
[45] Feb. 6, 1979

[54] ELECTRONIC WEIGHING APPARATUS

[75] Inventors: Noboru Uyama, Osaka; Tsutomu Ozaki, Amagasaki, both of Japan

[73] Assignee: Kubota Ltd., Osaka, Japan

[21] Appl. No.: 789,955

[22] Filed: Apr. 22, 1977

[30] Foreign Application Priority Data

May 1, 1976 [JP] Japan .................................. 51-50208

[51] Int. Cl.² ............................................ G01G 13/14
[52] U.S. Cl. .................................................... 177/165
[58] Field of Search ........................... 177/165, DIG. 6

[56] References Cited

U.S. PATENT DOCUMENTS 3,826,318  7/1974  Baumgartner ................ 177/DIG. 6
4,015,677  4/1977  Silva et al. .......................... 177/165

FOREIGN PATENT DOCUMENTS 2323669  11/1974  Fed. Rep. of Germany ........... 177/165

Primary Examiner—George H. Miller, Jr.
Attorney, Agent, or Firm—W. G. Fasse; W. W. Roberts

[57] ABSTRACT

An electronic weighing apparatus includes a scale mechanism having a weighing plate for placing thereon an article to be weighed in a package the latter constitutes a tare weight. A slit plate is movably associated with the weight of said article on said weighing plate and has a series of slots equally spaced in the moving direction. A light source is provided at one side of said slit plate. A photodetector is provided at the other side of said slit plate opposite to said light source, whereby a pulse train is generated from said photodetector. The number of pulses in the pulse train is associated with the movement of the slit plate and thus with the weight of said article. A counter for counting the number of pulses of said pulse train provides the weight value and a display displays the weight value in said counter. A balanced state detecting circuit detects that the weighing plate has reached a balanced state. A tare weight deduction instructing switch is manually operated and cooperates with, an AND gate receiving the output from said tare weight deduction instructing switch and the output from said balanced state detecting circuit. Resetting means are responsive to the output from said AND gate for resetting the tare weight value in the counter obtained for said tare, thereby to enable measurement of only the net weight of the article proper.

18 Claims, 7 Drawing Figures (a) OUTPUT a FROM AMP 11

(b) OUTPUT b FROM AMP 13

(c) OUTPUT c FROM LEVEL DETECT 12

(d) OUTPUT d FROM LEVEL DETECT 14

(e) OUTPUT e FROM PULSER 15a (f) OUTPUT f FROM PULSER 15a

ELECTRONIC WEIGHING APPARATUS

BACKGROUND OF THE INVENTION

1. Field of the Invention

The present invention relates to an electronic weighing apparatus. More specifically, the present invention relates to an electronic weighing apparatus for evaluating the price of an article through multiplication of the measured weight of the article by a preset unit price for displaying the price in a digital manner, which has been adapted such that the price of only the net weight of the article is evaluated through deduction of the tare weight from the gross weight of the article.

2. Description of the Prior Art

In measuring the net weight of an article being weighed, it is necessary to deduct the weight of a container containing the article, i.e., the tare weight, from the measured gross weight. It has been a most typical practice in the prior art for the above described deducting operation that only a tare weight representing item is first placed on an electronic weighing apparatus of a pulse count type, whereupon the counter is reset to zero upon depression of a tare reset switch. However, such prior art apparatus has suffered from various shortcomings as enumerated in the following.

(1) In making the zero adjustment of the weighing apparatus, the counter could be reset to zero by depressing the tare reset switch while the weighing plate of the apparatus is slightly raised by a finger erroneously or intentionally. However, this results in improper zero adjustment. Hence, a weight value larger than the actual weight of the article could be obtained and an erroneous price higher than the true net price of the article could be evaluated and displayed. In addition, since there is no restriction as to the amount of raising of the weighing plate when the tare reset switch is depressed, a substantial erroneous price could result.

(2) In initially setting the weight of the packing namely the tare weight of an article in the apparatus, only the packing is first placed on the weighing plate of the apparatus and then the tare reset switch is depressed to reset the counter of the apparatus to zero. In such a situation as well, the counter could be reset to zero while the weighing plate with the packing placed thereon is still moving in either an upward or downward direction or is slightly raised by a finger erroneously or intentionally. However, this results in an improper deduction of the tare weight. Hence, the weight value corresponding to said raising of the weighing plate could be added to a true net weight.

OBJECTS OF THE INVENTION

Therefore, a principal object of the present invention is to provide an electronic weighing apparatus capable of preventing improper measurement of weight caused by zero adjustment or tare weight resetting.

Another object of the present invention is to provide an electronic weighing apparatus wherein resetting of the tare weight in the tare weight deducting operation is enabled only when the weighing mechanism has reached a balanced or stabilized condition.

A further object of the present invention is to provide an electronic weighing apparatus wherein initial setting of the weight measurement is made subject to the scale mechanism being within a predetermined limit value.

SUMMARY OF THE INVENTION

Briefly stated, the present invention relates to an electronic weighing apparatus; comprising a displacement member displaceable in association with the weight of an article being measured, means for converting the diaplacement value of said displacement member into an electrical signal value associated with said displacement value, digital display means responsive to said electrical signal value for displaying the weight value of said article, means for detecting said displacement means having reached a stabilized condition, means for instructing tare weight deduction, and means responsive to the outputs from said stabilized condition detecting means and said tare weight deduction instructing means for resetting said display means. Therefore, the tare weight is reset in response to the output from said stabilized condition detecting means and the output from said tare weight deduction instructing means. As a result, an improved electronic weighing apparatus with digital display is provided wherein any improper weight measurement and misconduct in conjunction with zero adjustment and tare weight resetting can be prevented.

These objects and other objects, features, advantages, and aspects of the present invention will be more apparent from the following detailed description when taken in conjunction with the accompanying drawings.

DESCRIPTION OF THE PREFERRED EMBODIMENTS

Figure 1:
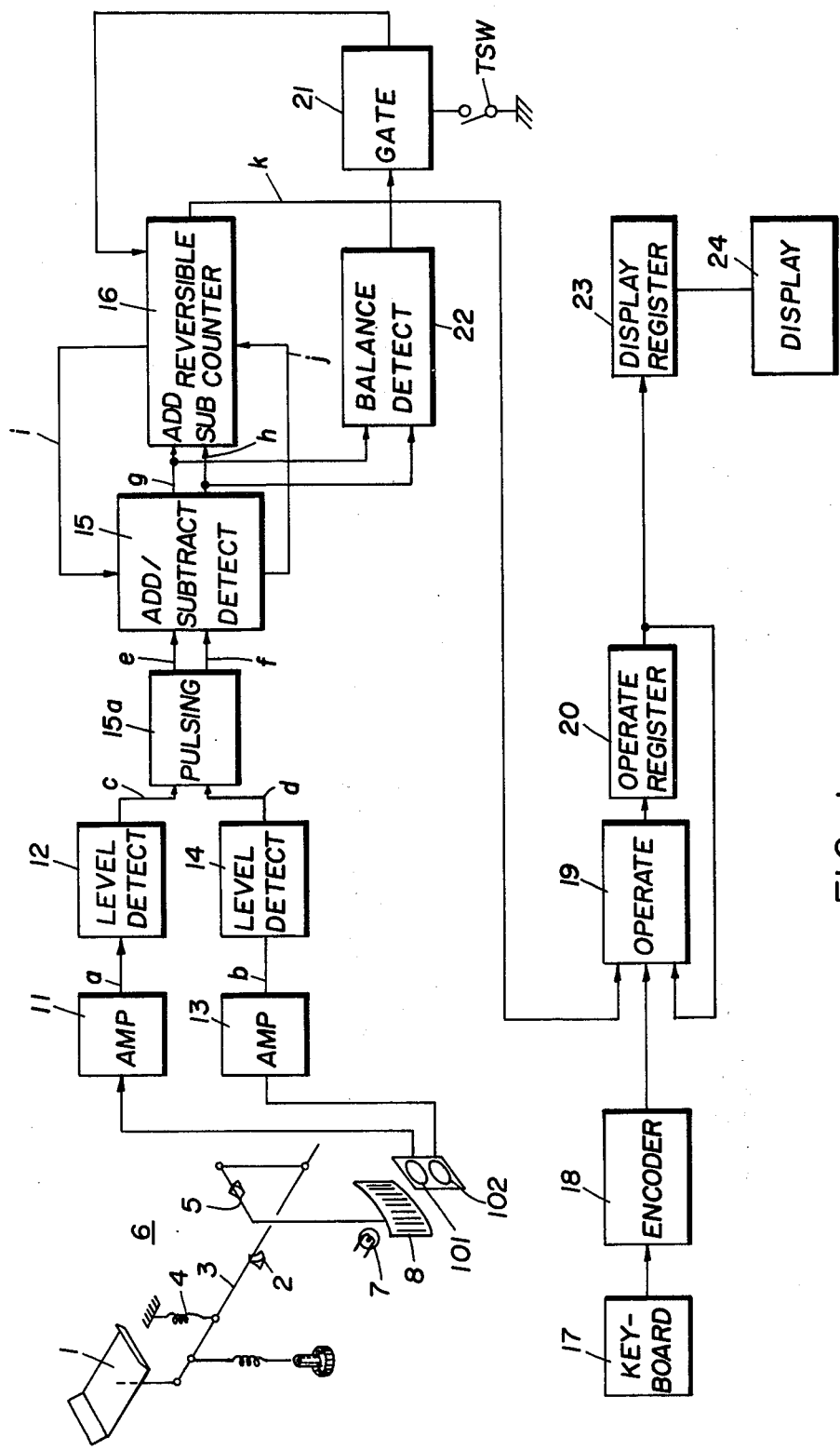
FIG. 1 is a block diagram of one embodiment of the present invention.

Referring to FIG. 1, a weighing mechanism 6 comprises a weighing plate 1 for supporting an article being weighed (not shown). An arm 3 is coupled to said weighing plate 1, and a knife edge 2 is a bearing for the arm 3. With the edge of the knife edge 2 as a supporting point, one side of the arm 3 is urged upwardly by a spring 4, while the opposite end of the arm 3 is coupled to one end of a lever 5. The lever 5 is also supported by means of another knife edge. The opposite end of the lever 5 is coupled to a slit plate 8.

Figures 2A, 2B, 3:
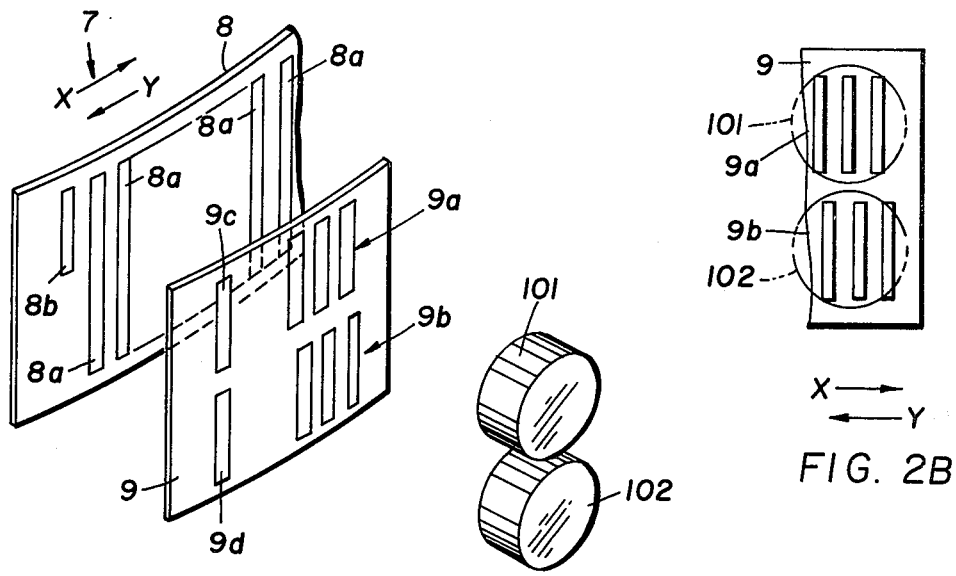
FIGS. 2A and 2B are enlarged views of portions of the weighing apparatus shown in FIG. 1.
FIG. 3 shows wave forms of electrical signals at various portions in the FIG. 1 diagram for use in explaining the operation of the FIG. 1 embodiment, wherein the abscissa has been adapted to correspond with the displacement amount (angle) of a slit plate 8.

Referring to FIG. 2A, the slit plate 8 has formed therein a plurality of slits 8a, 8a, . . ., equally spaced and extending in the vertical direction. The slit plate 8 has further formed therein an additional slit 8b for use in zero point detection which is as long as a half of the above described slit 8a, 8a, . . ., extending in the vertical direction and equally spaced from the left side of the group of the slits 8a, 8a, . . ., as viewed in FIG. 2A. A light source 7 is provided at the rear surface side of the slit plate 8 to emit light toward the slit plate 8 and another stationary slit plate 9 is provided at the front surface side of the slit plate 8, so that the light beam from the light source 7 is directed through the slit plates 8 and 9 in the direction perpendicular to the plates 8 and 9. The slit plate 8 may be made of a transparent glass plate, coated with an opaque material, with the slit portions 8a, 8a, ..., and 8b left uncoated, so as to form transparent slits. Alternatively, the slit plate 8 may be an opaque plate such as a metal plate formed of elongated apertures 8a, 8a, ..., and 8b.

The slit plate 9 has formed of two groups of slits 9a and 9b, positioned in the upper and lower half portions of the slit plate 9, each slit being as wide as the width of the slits 8a and 8b formed in the slit plate 8 and extending in parallel with the slits 8a and 8b of the plate 8. The positional relation of the upper group of the slit 9a and the lower group of the slits 9b is selected such that the upper slits 9a are displaced by a pitch corresponding to a quarter of one cycle of the slit arrangement with respect to the lower slits 9b in the horizontal direction, as shown in FIGS. 2A and 2B. The displacement of the upper and the lower slits 9a and 9b is aimed to detect the direction of the movement of the weighing plate 1 of the scale mechanism 6. The slit plate 9 has further formed therein additional slits 9c and 9d for zero point detection spaced apart leftward from the groups of the slits 9a and 9b side by side, respectively, by a given distance. The slits 9c and 9d are formed in substantially the same position in the horizontal direction, hence they are substantially vertically aligned. The slit plate 9 may also be made of a metallic opaque plate such as an aluminum plate having formed therein elongated apertures 9a, 9b, 9c and 9d.

Two photodetectors 101 and 102 are provided at the front side of the plate 9 so as to receive the light beam transmitted by the light source through the slits of the slit plates 8 and 9. More specifically, the photodetector 101 is positioned so as to face the group of slits 9a, while the photodetector 102 is positioned so as to face the group of slits 9b, as shown in FIG. 2B. On the other hand, two further photodetectors (not shown) are positioned so as to face the slits 9c and 9d, respectively, for the purpose of zero point detection.

Referring again to FIG. 1, the outputs from the photodetectors 101 and 102 are coupled to the corresponding amplifier 11 and 13, respectively. The outputs a and b from the amplifiers 11 and 13 are fed to level detectors 12 and 14, respectively, each comprising a Schmitt triggering circuit or the like. Each of these level detectors 12 and 14 is adapted to be responsive to each output from the corresponding photodetector 101 or 102 to detect the output at a predetermined threshold level to provide a rectangle wave output. The outputs c and d of rectangular wave forms from these level detectors 12 and 14 are both coupled to a pulsing circuit 15a comprising a differentiating circuit, for example. The pulsing circuit 15a is structured to be responsive to the respective outputs c and d to generate differentiated pulses at the rise and fall portions of the respective outputs c and d, thereby to selectively provide incremental pulses e or decremental pulses f in accordance with an incremental (downward) or decremental (upward) movement of the weighing plate of the scale mechanism 6. The incremental pulses e and the decremental pulses f are applied to the inputs to an addition/subtraction detecting circuit 15. The addition/subtraction detecting circuit 15 is adapted to be responsive to the outputs from the pulsing circuit 15a to detect the direction of the movement, i.e., an incremental or a decremental direction, of the weighing plate 1 of the scale mechanism 6, thereby to detect addition or subtraction to be carried out in a reversible counter 16 and to provide a corresponding addition or subtraction pulse train g or h (not shown in FIG. 3) and a minus sign signal j, as to be more fully described subsequently. The addition pulse g or the subtraction pulse h obtained from the addition/subtraction detecting circuit 15 is applied to an up count mode input ADD or a down count mode input SUB, respectively, of the reversible counter 16 for counting the number of pulses of the pulse train to provide a weight value in a digital manner. The output k (not shown in FIG. 3) from the reversible counter 16 comprising a coded signal representative of the measured weight value of the article is then applied to the input to an operation circuit 19. The addition/subtraction detecting circuit 15 is also adapted to receive a zero detected output i from the reversible counter 16 and to provide a minus sign signal j representative of the minus sign (−) of the data in the counter 16.

The operation circuit 19 is also adapted to receive a unit price signal obtained from an encoder 18, which is supplied from a key board 17. The key board 17 comprises at least ten numeral keys for the numerals 0, 1, 2, 3 ... 9, so that any numerical value for a desired unit price may be entered. The encoder 18 is structured to encode the entered numerical value into a coded unit price signal in the manner well known to those skilled in the art. The operation circuit 19 is structured to multiply the set unit price by the measured weight value, i.e., the set unit price X the measured weight value, to evaluate the price of the article, which is applied through an operation register 20 to the input of a display register 23. The output from the operation register 20 is also applied to one input to the operation circuit 19. The output from the display register 23 is applied to the input to a display 24 which may comprise a display decoder, a display driver, a display tube, and the like, as are well known to those skilled in the art.

On the other hand, the addition pulse g and the subtraction pulse h from the addition/subtraction detecting circuit 15 are applied to the inputs of a balance detecting circuit 22 for detecting that the weighing plate in the scale mechanism 6 has reached a balanced or stabilized condition. The output from the balance detecting circuit 22 is applied to the input to a gate 21. A tare weight deduction operating switch TSW is provided which is connected through the gate 21 to the reversible counter 16 by way of a clear or reset signal.

First the operation of the scale mechanism will be described with reference to FIGS. 2A, 2B and 3.

If and when an article being weighed (not shown) is placed on the weighing plate 1 of the scale mechanism 6, the arm 3 is rotated counter-clockwise as viewed in FIG. 1 with the edge of the knife edge 2 as a supporting point, as the spring 6 expands in association with the weight of the article. The arm 3 continues to rock about the supporting point, as the rocking transient diminishes until the arm 3 becomes stabilized where the urging force of the spring caused by the weight of the article and the force of restitution of the spring becomes balanced. The upward displacement of the opposite end of the arm 3 causes the lever 5 to be rotated about the supporting point at the center thereof counter-clockwise as viewed in FIG. 1, which in turn causes the slit plate 8 provided between the light source 7 and the photodetectors 101 and 102 to be displaced in the rightward direction as viewed in FIG. 1, which corresponds to an X arrow direction shown in FIG. 2B, and vice versa.

As a slit plate 8 is moved, the slits 8a, 8a, . . . formed on the slit plate 8 permit the light beam from the light source 7 to be transmitted therethrough to the photodetectors 101 and 102 intermittently. As a result, the photodetectors 101 and 102 facing the upper and lower groups of the slits 9a and 9b, respectively, of the slit plate 9 generate the sine wave or sinusoidal output signals of the wave forms (a) and (b) in FIG. 3, respectively. It is understood that the output from one photodetector 102 and thus the output (b) from the amplifier 13 is out of phase or delayed in quadrature or 90 degrees with respect to the output from the other photodetector 101 and thus the output (a) from the amplifier 11. The reason is that the slits 9a of the upper slit group and the slits 9b of the lower slit group of the slit plate 9 provided opposite to the photodetectors 101 and 102, respectively, have been displaced from each other by the pitch corresponding to a quarter of one cycle of the slits in the horizontal direction, which makes the timing relation of the light beam reaching the photodetectors 101 and 102 through the slit plates 8 and 9 be out of phase in quadrature or by a quarter of one cycle.

The slit plate 8 is moved in the X arrow direction or in the Y arrow direction, as the weighing plate 1 of the scale mechanism 6 is moved in the downward direction or the upward direction, respectively, and thus the relative relation of the output signals from the respective photodetectors 101 and 102 is reversed in both situations. The reason why the phase is shifted in quadrature as described above is that the direction of the movement of the weighing plate is to be detected by means of the pulsing circuit 15a and thus the addition/subtraction detecting circuit 15 to determine the addition mode or the subtraction mode in terms of the weight by means of the reversible counter 16. The outputs a and b from the amplifiers 11 and 13 are fed to the level detectors 12 and 14, respectively. If and when the threshold values of these level detectors 12 and 14 are set to the zero level with respect to the outputs from the amplifiers 11 and 13, the rectangle wave forms c and d shown in FIG. 3 (c) and (d) are obtained from the level detectors 12 and 14, respectively.

Although not shown in detail, the pulsing circuit 15a is adapted to differentiate the rise and fall portions of the respective outputs c and d of the level detectors 12 and 14 by means of, for example, two differentiating circuits. Assuming that the slit plate 8 is moving in the X arrow direction, detection is made that the output d is the low level at the rise timing of the output c and the output c is the high level at the rise timing of the output d, whereas the output d is the high level at the fall timing of the output c and the output c is the low level at the fall timing of the output d, whereupon the incremental direction is judged and the pulse output from the two differentiating circuts is adapted to be applied to one input to the addition/subtraction detecting circuit 15 by way of an incremental pulse train e, as shown in FIG. 3(e). Conversely, if and when the slit plate 8 is moving in the Y arrow direction, detection is made that the mutual relation of the outputs c and d is directly opposite to the above described case, whereupon the decremental direction is judged and the pulse output from said two differentiating circuits is applied to the other input to the addition/subtraction detecting circuit 15 by way of a decremental pulse train f, as shown in FIG. 3(f).

Figure 4:
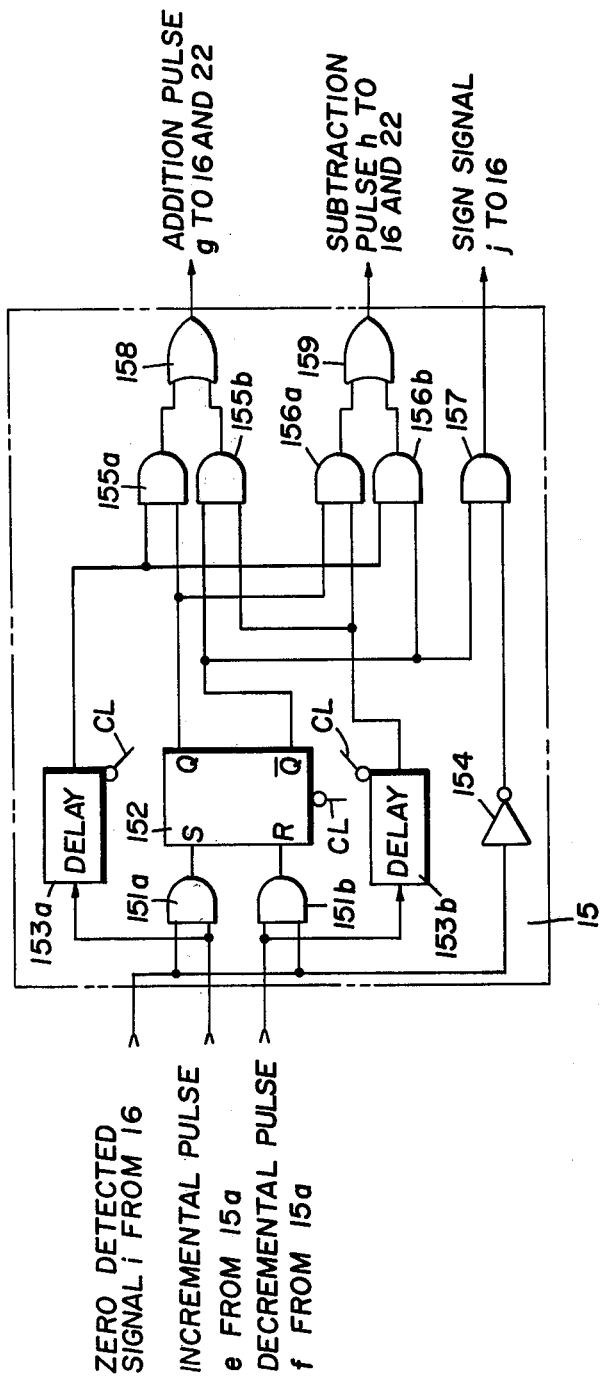
FIG. 4 is a detailed block diagram of an addition/subtraction detecting circuit 15 in the FIG. 1 diagram.

FIG. 4 is a block diagram showing in detail the addition/subtraction detecting circuit 15. With reference to FIG. 4, description will be made of how the state of addition or subtraction is determined. The incremental pulse output e from the pulsing circuit 15a is applied to one input of an AND gate 151a and is also applied to the input of a delay circuit 153a for the purpose of keeping synchronization of the circuit operation. The decremental pulse output f from the pulsing circuit 15a is applied to one input of an AND gate 151b and is also applied to the input of a delay circuit 153b for the purpose of keeping synchronization of the circuit operation. The output from the AND gate 151a is applied to the set input S of a flip-flop 152 and the output from the AND gate 151b is applied to the reset input R of the flip-flop 152. The flip-flop 152 is triggered with the clock pulse CL and the set output Q of the flip-flop 152 is applied to one input of AND gates 155a and 156a, while the reset output $\overline{Q}$ is applied to one input of AND gates 155b and 156b and to one input of an AND gate 157. The delay circuit 153a is triggered with the clock pulse CL and the output therefrom is applied to the other inputs of the AND gates 155a and 156b. The delay circuit 153b is similarly triggered with the clock pulse CL and the output therefrom is applied to the other inputs of the AND gates 155b and 156a. The outputs from these AND gates 155a and 155b are applied through an OR gate 158 to the reversible counter 16 and the balance detecting circuit 22 by way of an addition pulse g, while the outputs from these AND gates 156a and 156b are applied through an OR gate 159 to the reversible counter 16 and the balance detecting circuit 22 by way of a subtraction pulse h. The zero detected signal i obtainable when the contents in the reversible counter 16 are zero is applied of the other inputs to the AND gates 151a and 151b and is also applied, through an invertor 154, to the other inputs of the AND gate 157. The output from the AND gate 157 is applied to the reversible counter 16 by way of the minus sign signal j.

Now consider a case where the count value in the reversible counter 16, i.e., the measured weight value is zero. In such a situation the zero detected signal i is high level and accordingly the AND gate 151a and 151b are enabled. Now assuming that the slit plate 8 of the scale mechanism 6 moves in the X arrow direction and an incremental directional pulse as shown in FIG. 3(e) is obtained from the pulsing circuit 15a, the flip-flop 152 is set in synchronism with the clock pulse CL and the set output Q becomes the high level, while the reset output Q becomes the low level. Therefore, the AND gates 155a and 156a are enabled. At the same time, the pulse output is obtained from the delay circuit 153a in synchronism with the clock pulse CL. Accordingly, an addition pulse g is obtained from the AND gate 155a and thus from the OR gate 158. The addition pulse g is not shown in the drawing but is of the same wave form as the increment directional pulse shown in FIG. 3(e). Since the AND gate 157 has been disabled with the reset output $\overline{Q}$ of the flip-flop 152 at that time, the sign signal j remains at the low level.

Now assuming that the slit plate 8 of the scale mechanism 6 moves in the Y arrow direction if and when the measured weight value is zero and a decrement directional pulse f as shown in FIG. 3(f) is obtained from the pulsing circuit 15a, the flip-flop 152 is reset in synchronism with the clock pulse CL and the set output Q of the flip-flop 152 assumes the low level, while the reset output $\overline{Q}$ of the flip-flop 152 assumes the high level. Therefore, the AND gates 155b and 156b and 157 are enabled. At the same time, the pulse output is obtained from the delay circuit 153b in synchronism with the clock pulse CL. Accordingly, the addition pulse g is obtained from the AND gate 155b and thus from the OR gate 158. Since the AND gate 157 has been enabled with the reset output $\overline{Q}$ of the flip-flop 152 in such a situation, the sign signal j turns to be the high level, which indicates that the addition pulse g should be added in the negative direction.

Now consider a case where the count value in the reversible counter 16, i.e., the measured weight value is not zero (W ≠ 0). In such a situation the zero detected signal i is at the low level and accordingly the AND gates 151a and 151b are disabled. Now assuming that the slit plate 8 of the scale mechanism 6 moves in the X arrow direction and the increment directional pulse e as shown in FIG. 3(e) is obtained from the pulsing circuit 15a, the addition pulse g is obtained from the AND gate 155a and thus from the OR gate 158 if and when the flip-flop 152 has been set, whereas the subtraction pulse h is obtained from the AND gate 156b and thus from the OR gate 159 if and when the flip-flop 152 has been reset. On the other hand, assuming that the slit plate 8 of the scale mechanism 6 moves in the Y arrow direction in such a situation where the measured weight value is not zero, i.e., W ≠ 0 and the decrement directional pulse f as shown in FIG. 3(f) is obtained from the pulsing circuit 15a, the addition pulse g is obtained from the AND gate 155a and thus from the OR gate 158 if and when the flip-flop 152 has been reset, whereas the subtraction pulse h is obtained from the AND gate 156b and thus from the OR gate 159 if and when the flip-flop 152 has been set. It will be readily understood that in such a situation the sign signal j turns to the high level only if and when the zero detected signal i is at the high level and the decrement directional pulse f is received. Thus, the addition pulse g and the subtraction pulse h and the sign (−) signal j are obtained from the addition/subtraction detecting circuit 15.

The addition or subtraction pulse train g or h from the addition/subtraction detecting circuit 15 being applied to the up count input ADD or down count input SUB of the reversible counter 16 has been weighed such that each pulse represents a predetermined unit weight. Therefore, the count value in the reversible counter 16 represents the weight of an article placed on the weighing plate 1 of the scale mechanism 6, which has a sign of plus or minus. The count value or the weight value signal k in the reversible counter 16 is applied to the operation circuit 19, as described previously.

The operation circuit 19 multiplies the unit price set in advance by means of the key board 17, by the measured weight value obtained as described previously, thereby to evaluate the price of the article being weighted. Therefore, the display register 23 is supplied with the price, weight and unit price signals representing the price, weight and unit price of the article being measured, which is displayed by means of the display circuit 24.

Now consider a case where the balance detecting circuit 22 has not been provided in the FIG. 1 diagram and hence the output of the tare reset switch TSW is directly connected to the reversible counter 16. In initially setting the weight of the tare of an article in the apparatus, the reversible counter 16 could be reset to zero by depressing the tare reset switch TSW before the weighing plate 1 of the scale mechanism 6 reaches a balanced or stabilized condition during the diminishing rocking motion of the weighing plate 1 after a tare is placed on the weighing plate 1. In such a situation, the reversible counter 16 comes to store some weight value when the scale mechanism 6 has reached a balanced or stabilized condition. However, this results in improper deduction of the tare weight. Hence, the weight value could be added to a true net weight. Another similar problem could arise in that the reversible counter 16 could be reset to zero while the weighing plate 1 of the scale mechanism 6 with the tare weight thereon is slightly raised by a finger erroneously or intentionally. However, this also results in improper deduction of the tare weight. Hence, the weight value corresponding to the raising of the weighing plate could be added to a true net weight.

These problems can be solved by connecting the tare reset switch TSW through the gate 21 to the reversible counter 16 such that the gate 21 is enabled only if and when a balanced or stabilized condition of the weighing plate 1 of the scale mechanism is detected by the balance detecting circuit 22. More specifically, since a reset signal from the tare reset switch TSW is applied to the reversible counter 16 only if and when the weighing plate 1 has reached a balanced or stabilized condition, tare weight resetting can be avoided while the weighing plate 1 is still rocking or moving, as before the diminishing rocking movement comes to a stop or reaches a balanced condition or when the weighing plate 1 is raised by a finger, inasmuch as it is extremely difficult to attain a balanced state while the weighing plate 1 is slightly raised by a finger.

Now referring to FIG. 5, the balance detecting circuit 22 and the gate 21 will be described in more detail. The balance detecting circuit 22 comprises an OR gate 221, a retriggerable monostable multivibrator 222, a delay 223, a Schmitt circuit 224, and an invertor 225. The addition pulse g and the subtraction pulse h from the addition/subtraction detecting circuit 15 are applied as inputs to the OR gate 221. The output from the OR gate 221 is applied to the monostable multivibrator 222 to trigger the same. The monostable multivibrator 222 is structured such that an output pulse of a pulse width is provided which is sufficient to trigger the subsequent stage delay circuit 223. The delay circuit 223 comprise an RC time constant circuit such that a capacitor is charged rapidly and discharged slowly to attain a desired delay time. The output from the delay circuit 223 of the wave form as described above is applied to the Schmitt circuit 224 for level detecting at a predetermined threshold level and for wave shaping. The output from the Schmitt circuit 224 is inverted by the invertor 225.

The gate 21 comprises a set of cascade connected delay type flip-flops 211, 212 and 213, an invertor 214, and AND gates 215 and 216. The delay type flip-flops 211, 212 and 213 are triggered by the clock pulse CL to be set if and when a set input is applied. The flip-flop 211 is connected to receive the output from the tare reset switch TSW at the set input thereto. The set output from the flip-flop 211 and the output from the invertor 214 are applied to the input of the AND gate 215. The AND gate 216 is connected to receive, as inputs thereto, the output from the invertor 225, the reset output from the monostable multivibrator 222, and the output from the AND gate 215. Preferably, the invertor 214 is also connected to receive the output from an initial value limit switch IVL operatively coupled to the slit plate 8 for detecting the slit plate 8 and thus the weighing plate 1 having been raised beyond a predetermined value from an initial position.

In operation, first let it be assumed that the scale mechanism 6 has not reached a balanced state and the weighing plate 1 and thus the slit plate 8 has been moving in either direction. Therefore, either pulse g or h is received through the OR gate 221 and is applied to the monostable multivibrator 222. Hence, the monostable multivibrator 222 is kept triggered, insofar as either pulse g or h is obtained. As a result, the Q output of the high level is applied to the delay 223 while the $\overline{Q}$ output of the low level is applied to the AND gate 216, thereby to disable the same. The capacitor of the RC time constant circuit in the delay 223 is rapidly charged and is kept charged, insofar as either pulse g or h is received and hence the monostable multivibrator 222 is triggered. The Schmitt circuit 224 serves to level detect the output from the delay 223 to provide the output of the high level. As a result, the output of the low level is obtained from the invertor 225 and is applied to the AND gate 216. The AND gate 216 has been disabled, as described above, however.

Now assume that the scale mechanism 6 reaches a balanced or stabilized condition and hence neither pulse g nor h comes to be obtained any more. Therefore, after a predetermined time period, the logical state of the output of the monostable multivibrator 222 is reversed and the $\overline{Q}$ output becomes the high level while the Q output becomes the low level. The $\overline{Q}$ output of the high level is applied to the AND gate 216 to enable the same. On the other hand, the capacitor of the RC time constant in the delay 223 is slowly discharged. Such a gradually decreasing change of the output from the delay 223 is level detected by the Schmitt circuit 224. As a result, after the lapse of a predetermined delay time period after the scale mechanism 6 has reached a balanced or stabilized condition, the output from the Schmitt circuit 224 assumes to the low level. The output of the low level from the Schmitt cirucit 224 is inverted by the invertor 225 to assume the high level and the high level output is applied to the AND gate 216.

From the foregoing description, the following is appreciated. During the time period when the scale mechanism has been rocking, the AND gate 216 is disabled. Even after the scale mechanism 6 has reached a balanced or stabilized condition, the AND gate 216 is kept disabled until after the lapse of a predetermined delay time period determinable by the delay 223.

In other words, after the lapse of the predetermined delay time period determinable by the delay 223 after the scale mechanism 6 has reached a balanced or stabilized condition, the AND gate 216 is enabled.

Now the operation of the gate 21 is considered. Assume that the tare reset switch TSW is depressed for the purpose of resetting the tare weight stored in the reversible counter 16. The output from the tare reset switch TSW is applied to the flip-flop 211 to set the same responsive to the first clock pulse CL. As a result, the set output of the high level is applied to the AND gate 215. Since the set output of the flip-flop 213 is the low level at that time, the output from the invertor 214 is at the high level. Therefore, the input condition of the AND gate 215 is met and the output of the high level is obtained therefrom. As a result, the input condition of the AND gate 216 is met and the output of the high level is obtained from the AND gate 216 and is applied to the reversible counter 16 by way of a clear signal, thereby to reset the tare weight stored therein. Since the flip-flops 211, 212 and 213 are kept supplied with a train of clock pulses CL, the flip-flop 212 is triggered with the following clock pulse CL and is set, whereby the set output of the flip-flop 212 assumes the high level. Similarly, the flip-flop 213 is triggered with the next following clock CL to be set, whereby the set output of the flip-flop 213 assumes the high level. As a result, the output from the invertor 214 assumes the low level and accordingly the output from the AND gate 215 assumes the low level. At the same time the output from the AND gate 216 assumes the low level and thus the clear signal to be appleid to the reversible counter 16 is terminated. Thus, it is appreciated that the gate 21 is responsive to the depression of the tare reset switch TSW to generate a single clear signal of a predetermined pulse width determined by two cycles of the clock pulses CL. Such a pulse width of the clear signal is determined by the pulse repetition frequency of the clock pulses CL and the number of flip-flops 211, 212 and 213 and is selected to be as small as possible insofar as the same is large enough to clear the reversible counter 16.

In simultaneous consideration of the gate 21 and the balance detecting circuit 22, it is appreciated that a clear signal is obtained only when the tare reset switch TSW is depressed after the lapse of more than a predetermined time period after the scale mechanism has reached a balanced or stabilized condition and the said predetermined time period is determinable by the delay 213. Thus, any problem which might be encountered in conjunction with the tare reset switch TSW can be solved according to the present invention.

From the foregoing description of the gate 21, it is appreciated that the gate 21 serves to generate a single clear signal in response to depression of the tare reset switch TSW. Therefore, a combination of the flip-flops 211, 212 and 213, the invertor 214 and the AND gate 215 may be replaced by a proper monostable multivibrator that is responsive to depression of the tare reset switch TSW to generate a single similar pulse.

From the foregoing description, it is further appreciated that in order to generate a clear signal it is necessary that the tare reset switch TSW is depressed after the lapse of the delay time determinable by the delay 223 since the scale mechanism 6 has reached a balanced or stabilized condition. Since depression of the tare reset switch serves to generate only a single pulse output from the AND gate 215, no clear pulse is obtained even if more than the delay time determinable by the delay 223 had lapsed after the scale mechanism 6 has reached a balanced state while the tare reset switch is kept depressed. It is readily understood that it is very difficult to depress the tare reset switch TSW while the scale mechanism is brought to a stabilized or balanced state with the weighing plate slightly raised with a finger. As a result, any improper weight measurement and misconduct in conjunction with tare weight resetting can be prevented.

Figure 5:
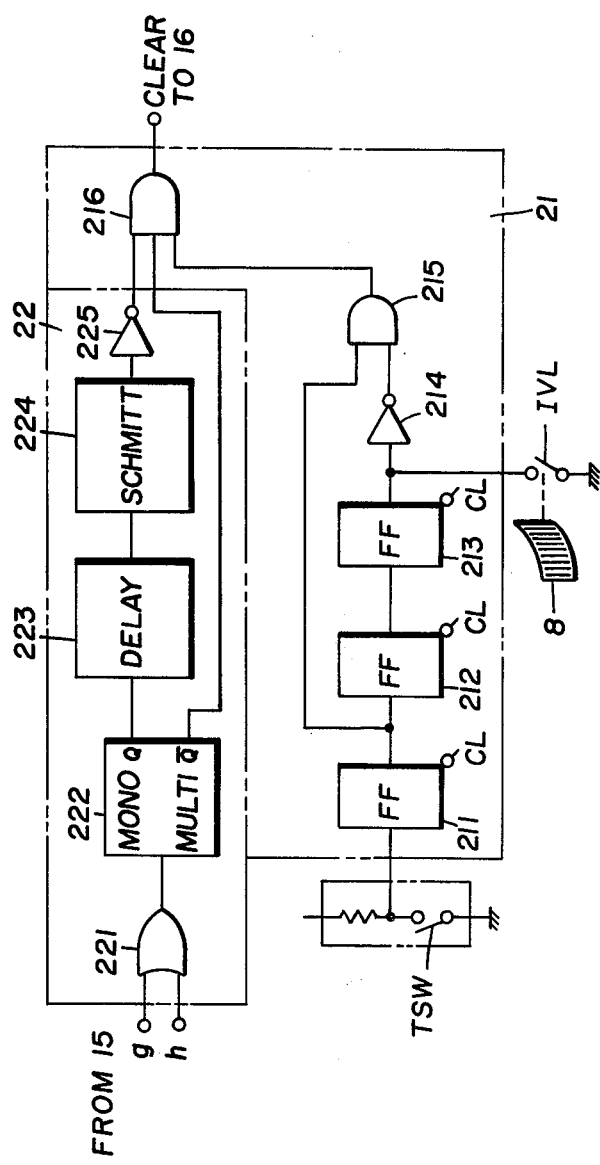
FIG. 5 is a detailed block diagram of a balance detecting circuit 22 and a gate 21 in the FIG. 1 diagram.

Referring to FIG. 5, the embodiment shown is further structured such that the output from the initial value limit switch IVL is applied to the input of the invertor 214 of the gate 21. As described previously, the initial value limit switch IVL serves to detect the scale mechanism 6 having been raised beyond a predetermined value from an initial position. Therefore, if and when the scale mechanism 6 is brought beyond the predetermined limit value by raising the weighing plate 1 with a finger for the purpose of initial setting, the high level output is obtained therefrom and is inverted by the invertor 214 to assume the low level, which serves to disable the AND gate 215 and accordingly disable the AND gate 216, with the result that the depression of the tare set switch TSW is disabled in such a situation. This insures that the initial setting is enabled only if and when the scale mechanism 6 is in a predetermined limit value range.

Figure 6:
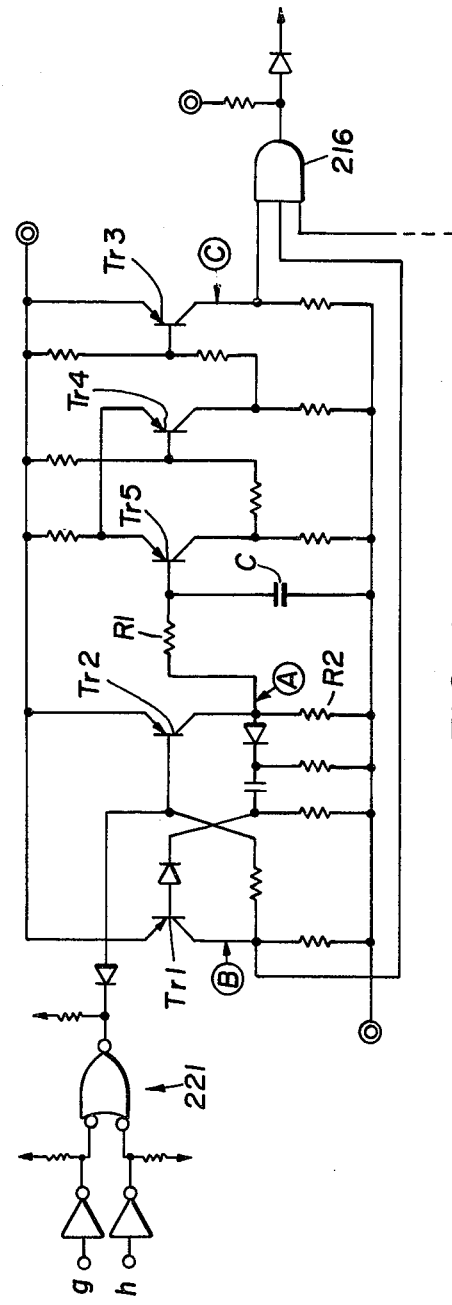
FIG. 6 shows a schematic diagram of a balance detecting circuit 22 in the FIG. 5 diagram.

FIG. 6 shows a schmatic diagram of a balance detecting circuit 22 shown in FIG. 5. Referring to FIG. 6, the monostable multivibrator 222 is implemented by transistors TR1 and TR2 and other circuit components connected therewith, as is well known to those skilled in the art. The delay 223 is implemented by resistors R1 and R2, a capacitor C, and other circuit components connected therewith, as is well known to those skilled in the art. The RC time constant circuit is formed by the resistors R1 and R2 and the capacitor C. The rapid charging is effected through the current path from the point A through the resistor R1 and the capacitor C, while the slow discharging is effected through the current path from the capacitor C through the resistors R1 and R2, as is well known to those skilled in the art. The Schmitt circuit 224 is implemented by transistors TR4 and TR5 and other circuit components connected therewith, as is well known to those skilled in the art. The invertor 225 is implemented by a transistor TR3 and other circuit components connected therewith.

Although the present invention has been described and illustrated in detail, it is to be clearly understood that the same is by way of illustration and example only and is not to be taken by way of limitation, the spirit and scape of this invention being limited only by the terms of the appended claims.

What is claimed is:

1. An electronic weighing apparatus for weighing an article in a packing, which packing constitutes a tare weight, comprising: displacement means responsive to the weight of an article being weighed for causing a displacement associated with the weight of said article, said displacement means comprising article support means for placing said article thereon, electrical signal providing means responsive to the displacement of said displacement means for providing an electrical signal associated with the displacement of said displacement means and thus with the gross weight of said article and packing, said electrical signal being variable prior to said displacement means achieving a stable state, enabling signal providing means operatively coupled to said electrical signal providing means and responsive to said electrical signal becoming steady for providing an enabling signal within a predetermined delay period of time following the point of time when said electrical signal became steady, tare weight deduction instructing means for instructing the deduction of said tare weight from the gross weight of said article and said packing, said tare weight deduction instructing means being enabled only when a tare weight is placed on said article support means, an article without the packing being further placed on said article support means after said tare weight deduction instructing means is enabled, and tare weight deducting means responsive simultaneously to the enabling signal output from said enabling signal providing means and to the output from said tare weight deduction instructing means for deducting said tare weight from the gross weight of said article and said packing for providing a net weight of said article.

2. The electronic weighing apparatus of claim 1, further comprising means responsive to the displacement of said displacement means beyond a predetermined amount from the initial position of said displacement means for generating a further enabling signal, and means responsive to said further enabling signal for disabling said tare weight deducting means.

3. The electronic weighing apparatus of claim 1, wherein said tare weight deduction instructing means comprises manually operable switch means for instructing the deduction of said tare weight from said gross weight of said article and said packing, and means responsive to the output from said manually operable switch means for providing a tare weight deduction instructing signal having a predetermined pulse width, said tare weight deducting means being adapted to be responsive to simultaneous outputs from said enabling signal providing means and from said tare weight deduction instructing signal providing means.

4. The electronic weighing apparatus of claim 3, wherein said tare weight deduction instructing signal providing means comprises means responsive to the output from said manually operable switch means for being triggered and for making a shifting operation as a function of clock pulses.

5. The electronic weighing apparatus of claim 1, wherein said enabling signal providing means comprises means operatively coupled to said electrical signal providing means and responsive to variation of said variable electrical signal, for defining a predetermined time period following said variation of said electrical signal, and means operatively coupled to said predetermined time period defining means for providing said enabling signal after said predetermined time period.

6. The electronic weighing apparatus of claim 5, wherein said enabling signal providing means comprises further means operatively coupled to said electrical signal providing means and responsive to non-variation of said electrical signal for providing a further enabling signal in addition to said first mentioned enabling signal, and means responsive to simultaneous outputs from said first mentioned and further enabling signal providing means for providing a logical product output as said enabling signal.

7. The electronic weighing apparatus of claim 1, wherein said electrical signal providing means comprises means responsive to the displacement of said displacement means for generating a pulse train having a number of pulses which represent the displacement of said displacement means, and means operatively coupled to said pulse train generating means for counting the number of pulses in the pulse train.

8. The electronic weighing apparatus of claim 7, wherein said pulse train generating means comprises a grating member movable in association with the displacement of said displacement means and having an arrangement of transparent portions equally spaced in an opaque background portion and arranged in the displacement direction of said movable grating member, light source means located at one side of said movable grating member for emitting a light beam toward said movable grating member, photodetecting means provided at the other side of said movable grating member opposite to said light source means for receiving the light beam from said light source means through said movable grating member, and means responsive to the output from said photodetecting means for pulsing the output into a pulse form.

9. The electronic weighing apparatus of claim 8, wherein said pulse train generating means further comprises a stationary grating member fixedly provided between said movable grating member and said photodetecting means, said stationary grating member being formed of two slits displaced in the displacement direction of said movable grating member, said photodetecting means comprises two photodetectors provided individually opposite to said two slits, and which further comprise means responsive to the outputs from said two photodetectors for detecting the direction of the movement of said movable grating member.

10. The electronic weighing apparatus of claim 1, in which said tare weight deducting means comprises tare weight deduction signal providing means responsive to simultaneous outputs from said enabling signal providing means and from said tare weight deduction instructing means for providing a tare weight deduction signal, and resetting means responsive to said tare weight deduction signal for resetting said electrical signal providing means.

11. The electronic weighing apparatus of claim 10, wherein said electrical signal providing means comprises means responsive to the displacement of said displacement means for generating a pulse train having a number of pulses representing the displacement of said displacement means, and means operatively coupled to said pulse train generating means for counting the number of pulses of said pulse train.

12. The electronic weighing apparatus of claim 11, wherein said enabling signal providing means comprises monostable multivibrator means operatively coupled to said pulse train generating means for assuming one state for a first predetermined time period and thereafter assuming another state, delay means operatively coupled to said monostable multivibrator means and responsive to said one state thereof for providing a delay output signal with a second predetermined time period, and means responsive to the simultaneous outputs of said delay means and the other state output of said monostable multivibrator means for providing a logical product signal as said enabling signal.

13. The electronic weighing apparatus of claim 11, wherein said enabling signal providing means comprises means operatively coupled to said pulse train generating means and responsive to the presence of pulses for defining a predetermined time period following said presence of pulses, and means operatively coupled to said predetermined time period defining means for providing said enabling signal after said predetermined time period as said enabling signal.

14. The electronic weighing apparatus of claim 13, wherein said enabling signal providing means comprises further means operatively coupled to said pulse train generating means and responsive to the absence of pulses for providing a further enabling signal, and means responsive to simultaneous outputs of said first mentioned and further enabling signal providing means for providing a logical product output as said enabling signal.

15. The electronic weighing apparatus of claim 11, wherein said enabling signal providing means comprises pulse absence detected signal providing means operatively coupled to said pulse train generating means and responsive to said pulse train for detecting the absence of the pulses for providing a pulse absence detected signal, and delay means operatively coupled to said pulse absence detected signal providing means for delaying said pulse absence detected signal for a predetermined delay period of time for providing said enabling signal.

16. The electronic weighing apparatus of claim 15, wherein said delay means comprises storage means responsive to said pulse train for being rapidly charged or discharged and being slowly discharged or charged with a predetermined time constant, and means operatively coupled to said storage means for level detecting the output from said storage means.

17. The electronic weighing apparatus of claim 15, wherein said enabling signal providing means further comprises means responsive to said pulse train for generating a triggering pulse for triggering said delay means.

18. The electronic weighing apparatus of claim 17, wherein said triggering pulse generating means comprises monostable multivibrator means responsive to said pulse train and having a first and a second output terminal which are complementary to each other, said first output terminal of said monostable multivibrator means being coupled to said delay means, said second output terminal of said monostable multivibrator means constituting said pulse absence detected signal providing means.

* * * * *